(12) United States Patent
Yoshida et al.

(10) Patent No.: US 6,218,764 B1
(45) Date of Patent: Apr. 17, 2001

(54) ACTUATOR USING ELECTROMECHANICAL TRANSDUCER AND DRIVE PULSE GENERATOR SUITABLE THEREOF

(75) Inventors: Ryuichi Yoshida, Sakai; Toshiro Higuchi; Akira Hamamatsu, both of Yokohama, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/150,464

(22) Filed: Sep. 9, 1998

(30) Foreign Application Priority Data

Sep. 26, 1997 (JP) .................................................. 9-277945

(51) Int. Cl.⁷ ...................................................... H02N 2/00
(52) U.S. Cl. ........................................... 310/317; 310/314
(58) Field of Search ...................................... 310/314, 317

(56) References Cited

U.S. PATENT DOCUMENTS

| | | | |
|---|---|---|---|
| 4,622,483 | * 11/1986 | Staufenberg, Jr. et al. | 310/328 |
| 4,689,514 | * 8/1987 | Kondoh et al. | 310/316 |
| 5,589,723 | 12/1996 | Yoshida et al. | 310/328 |
| 5,907,212 | * 5/1999 | Okada | 310/328 |
| 5,917,267 | * 6/1999 | Miyazawa et al. | 310/317 |
| 5,969,464 | * 6/1999 | Nakano et al. | 310/328 |

OTHER PUBLICATIONS

Document H39, Development of Smooth Impact Mechanism (SIDM) (Third Phase), by Ryuichi Yoshida, et al, from the Proceedings of Japan Society of Precision Engineering (JSPE) issued on Sep. 10, 1997 (translation provided).

Document H40, Development of Smooth Impact Mechanism (SIDM) (Fourth Phase), by Ryuichi Yoshida, et al, from the Proceedings of Japan Society of Precision Engineering (JSPE) issued on Sep. 10, 1997 (translation provided).

* cited by examiner

*Primary Examiner*—Thomas M. Dougherty
(74) *Attorney, Agent, or Firm*—Sidley & Austin

(57) ABSTRACT

An actuator using an electromechanical transducer capable of driving efficiently and at high speed and a drive pulse generating apparatus, in which the frequency f of a drive pulse is set in a range satisfying equation (1) and the wavelength T is set in a range satisfying equations (2), (3) and (4);

$$(1/3)fr < f < (2/3)fr \quad (1)$$

$$0.4 < (T1/T) < 0.8 \quad (2)$$

$$0.35 < (T2/T1) < 0.95 \quad (3)$$

$$0 < (T3/T2) < 0.3 \quad (4)$$

where fr: resonance frequency of an oscillating member including the electromechanical transducer, T1: drive pulse width, T2: width of a gradually changing portion of drive pulse voltage, T3: width of a rapidly changing portion of drive pulse voltage and where $0.1 < (T3/T2) < 0.3$ may be satisfied.

11 Claims, 12 Drawing Sheets

ACTUATOR USING ELECTROMECHANICAL TRANSDUCER AND DRIVE PULSE GENERATOR SUITABLE THEREOF

This application is based on patent application No. 9-277945 filed in Japan, the contents of which is hereby incorporated by reference.

BACKGROUND OF THE INVENTION

1. Field of the Invention

The present invention relates to an actuator using an electromechanical transducer and a drive pulse generating apparatus suitable for driving the actuator.

2. Prior Art

Various actuators have conventionally been used for driving a member constituting a precision apparatus of a camera, an XY stage or the like and as an actuator which is small-sized, light-weighted and capable of carrying out fine positioning, there has been proposed by the applicant an electromechanical transducer, for example, a linear progressing type actuator which is constituted to generate elongation and contraction displacement in a piezoelectric element, transmit the elongation and contraction displacement to a drive member and move a driven member via a moving member frictionally coupled to the drive member (U.S. Pat. No. 5,589,723).

Although drive pulses of sawtooth waves are used in a linear progressing type actuator or a rotary type actuator using an electromechanical transducer mentioned above, it has been found that the frequency of the drive pulse and the drive speed are not in a proportional relationship, when the frequency of the drive pulse exceeds a certain range, the drive speed is decreased and there is a limit in increasing the drive speed even when the frequency of the drive pulse is increased.

SUMMARY OF THE INVENTION

It is a principal object of the present invention to provide an actuator using an electromechanical transducer capable of driving at high speed and efficiently and a drive pulse generating apparatus outputting drive pulses capable of driving such an actuator at high speed and efficiently.

It is another object of the present invention to provide a drive pulse generating apparatus for determining a range of frequency and a range of wavelength of drive pulses in a sawtooth wave capable of driving an actuator using an electromechanical transducer at high speed and efficiently and outputting such drive pulses.

Other object of the present invention will become apparent from a detailed description of the present invention in reference to the attached drawings.

DETAILED DESCRIPTION OF THE PREFERRED EMBODIMENTS

An explanation will be given of embodiments according to the present invention. First, an explanation will be given of the constitution and the operation of a linear progressing type actuator and a rotary type actuator using piezoelectric elements as specific examples of actuators using electromechanical transducers mentioned above.

Figure 1:
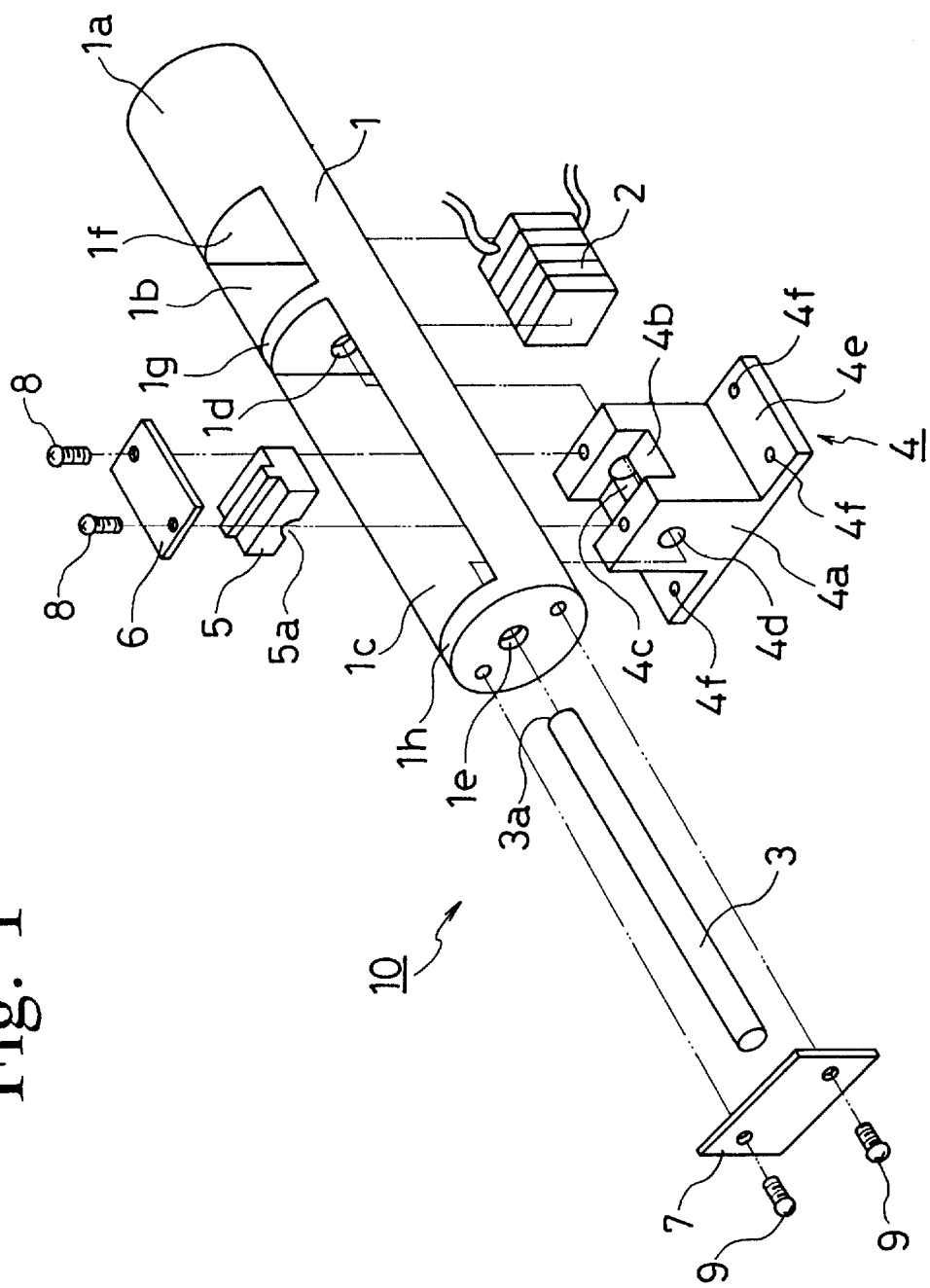
FIG. 1 is a disassembled perspective view showing the constitution of a linear progressing type actuator using a piezoelectric element.
Figure 2:
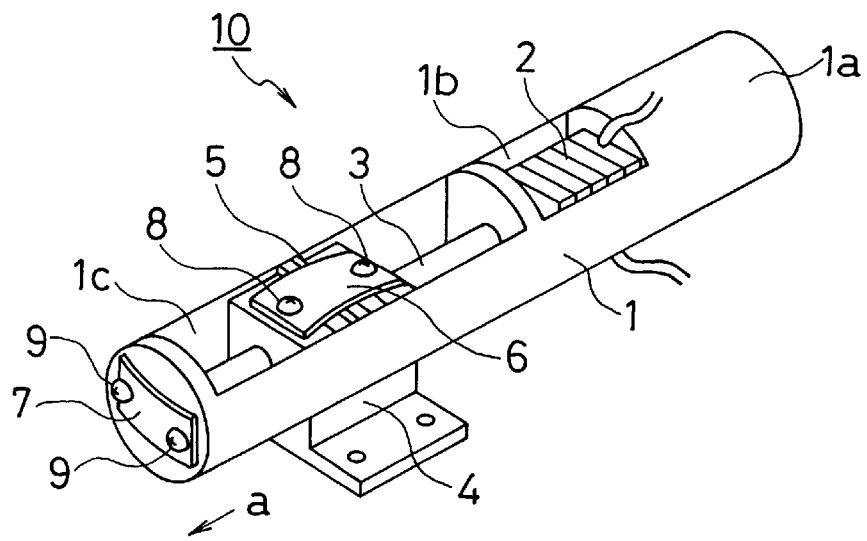
FIG. 2 is a perspective view showing an assembled state of the actuator shown by FIG. 1.

FIG. 1 and FIG. 2 show a first example of an actuator using a piezoelectric element and the actuator is a linear progressing type actuator. FIG. 1 shows a disassembled state thereof and FIG. 2 shows an assembled state thereof. An actuator 10 is constituted by a piezoelectric element 2, a drive shaft 3 (first member), a slider 4 (second member), a stationary member 1 (third member) and so on and a driven member, not illustrated, is coupled to the slider 4.

The drive shaft 3 (first member) and the stationary member 1 (third member) are constituted such that mass of the drive shaft (first member) is smaller than mass of the stationary member 1 (third member) (mass of first member<mass of third member).

The stationary member 1 is formed substantially in a cylindrical shape and one end portion 1a thereof is a portion for attaching to an apparatus, not illustrated. The stationary member 1 is formed with a hole 1b for containing the piezoelectric element 2 and a hole 1c for containing the slider 4, a partition plate 1g is formed between the hole 1b and the hole 1c and an end plate 1h is formed at an end of the stationary member 1 on the side of the hole 1c.

The piezoelectric element 2 is contained in the hole 1b of the stationary member 1, one end thereof is fixedly adhered to one wall face 1f of the hole 1b of the stationary member 1 and other end thereof is fixedly adhered to an end portion 3a of the drive shaft 3.

The drive shaft 3 is supported by a bearing hole 1d installed at the partition plate 1g of the stationary member 1 and a bearing hole 1e installed at the end plate 1h movably in the axial direction and the drive shaft 3 is reciprocated in the axial direction by elongation and contraction displacement in thickness direction of the piezoelectric element 2.

Numeral 7 designates a leaf spring which is fixed to the end plate 1h of the stationary member 1 by screws 9 to push the drive shaft 3 slightly projected from the bearing hole 1e at one end of the stationary member 1. Thereby, the drive shaft 3 is pushed to the piezoelectric element 2 by predetermined force and the push force can be adjusted by a degree of fastening the screws 9.

The slider 4 is provided with a main body portion 4a frictionally coupled to the drive shaft 3 and an attaching portion 4e for fixing a driven member, not illustrated, (for example, lens holding frame or the like). The main body portion 4a is formed with a notched portion 4b at a central portion thereof and holes 4d in which the drive shaft 3 penetrates are installed at left and right wall face portions of the notched portion 4b. Further, the notched portion 4b is formed with a groove 4c having a section in a semicircular shape which is brought into contact with substantially a lower half portion of the drive shaft 3. The attaching portion 4e is installed with attaching screw holes 4f for attaching the driven member.

A pad 5 which is brought into contact with the drive shaft 3 penetrating the holes 4d from above, is fittedly inserted into the notched portion 4b and a groove 5a having a section in a semicircular shape which is brought into contact with substantially an upper half portion of the drive shaft 3, is formed at the lower face of the pad 5. The pad 5 is constituted such that it is fitted to left and right wall faces of the notched portion 4b in a tightly fitted state.

Further, the pad 5 is pushed and frictionally coupled to the drive shaft 3 by a leaf spring 6 fixed to the main body portion 4a of the slider 4 by screws 8 and the push force can be adjusted by a degree of fastening the screws 8.

Figure 3:
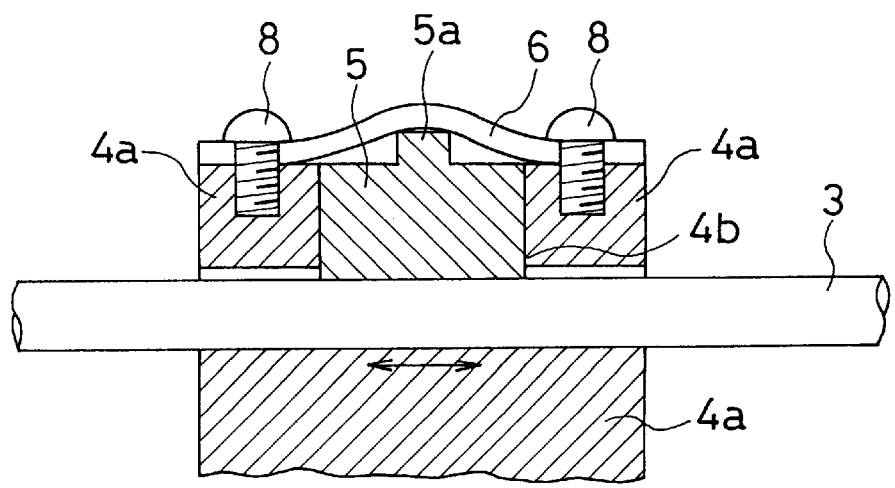
FIG. 3 is a sectional view showing the constitution of a frictionally coupled portion of the actuator shown by FIG. 1.

FIG. 3 shows a sectional view showing the constitution of a frictionally coupled portion for frictionally coupling the drive shaft 3, the main body portion 4a of the slider 4 and the pad 5 in which the pad 5 is fittedly inserted into the notched portion 4b formed at the main body portion 4a of the slider 4. A projected part 5a provided at the upper face of the pad 5 is pushed downwardly by the leaf spring 6 fixed to the main body portion 4a by the screws 8 and the pad 5 is frictionally coupled to the drive shaft 3 by pertinent push force.

Figure 4A:
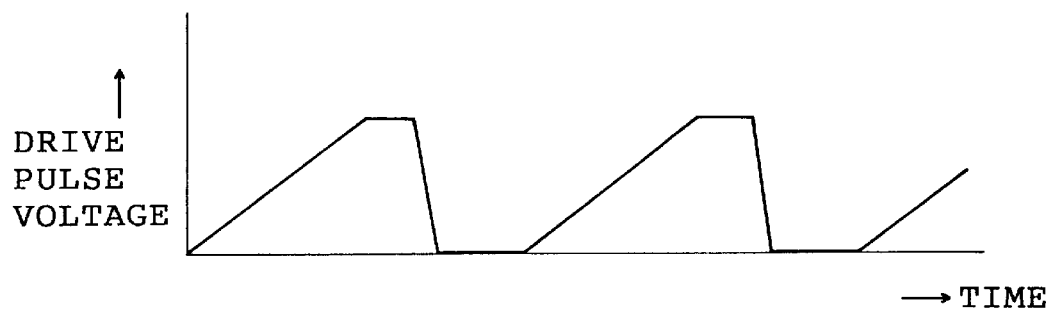
FIGS. 4(a) and 4(b) are diagrams for explaining waveforms of drive pulses.

Next, an explanation will be given of operation of the actuator. When the piezoelectric element 2 is applied with a drive pulse having a waveform comprising a gradual rise portion and a steep fall portion succeeding thereto as shown by FIG. 4(a), at the gradual rise portion of the drive pulse, the piezoelectric element 2 is displaced to elongate gradually in the thickness direction and the drive shaft 3 is displaced in an arrow mark "a" direction in the axial direction. Therefore, the slider 4 frictionally coupled to the drive shaft 3 is also moved in the arrow mark "a" direction and accordingly, the driven member attached to the slider 4 can be moved in the arrow mark "a" direction. Further, an explanation will be given later of frequency, wavelength and other conditions of the drive pulse 2.

At the steep fall portion of the drive pulse, the piezoelectric element 2 is displaced to contract rapidly in the thickness direction and the drive shaft 3 is also displaced in a direction reverse to the arrow mark "a" in the axial direction. At this moment, the slider 4 frictionally coupled to the drive shaft 3 remains unmoved substantially at the position by overcoming frictional coupling force between the slider 4 and the drive shaft 3 by its inertia force.

Incidentally, "substantially" mentioned here signifies to include a case in which the slider 4 follows the drive shaft 3 while causing a slip therebetween and is moved in the arrow mark "a" direction as a whole by a difference in drive time periods either in the arrow mark "a" direction and a direction reverse thereto. What moving mode is brought about, is determined in accordance with a given frictional condition.

By continuously applying the drive pulses having the above-described waveform on the piezoelectric element 2, the slider 4 and the driven member attached to the slider 4 can be moved continuously in the direction designated by the arrow mark "a".

Figure 4B:
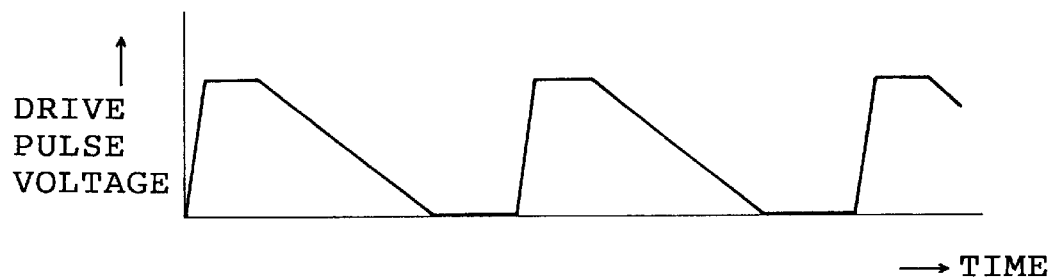

In driving the driven member in a direction reverse to the arrow mark "a", the movement can be achieved by applying a drive pulse having a waveform comprising a steep rise portion and a gradual fall portion as shown by FIG. 4(b) on the piezoelectric element.

Figure 5:
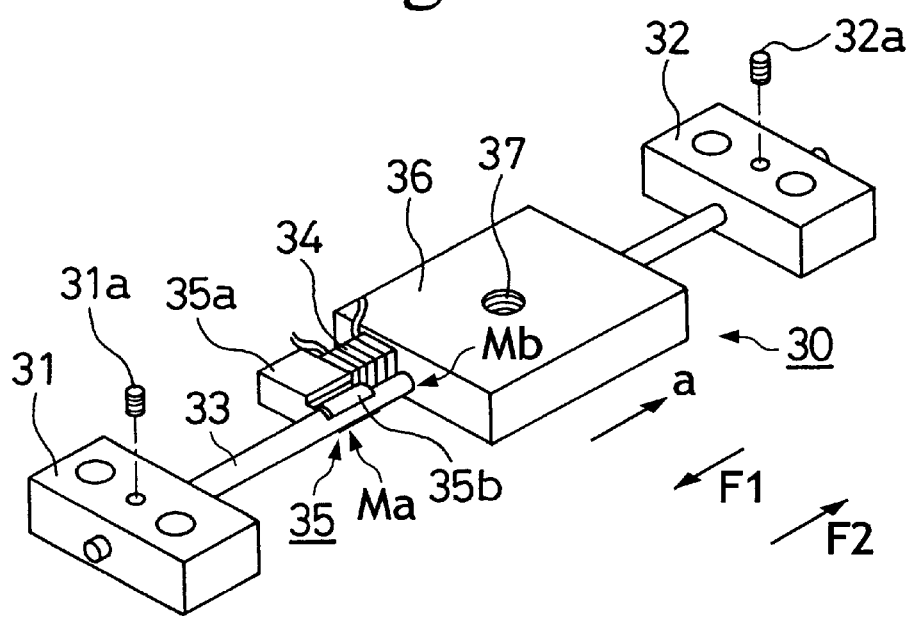
FIG. 5 is a disassembled perspective view showing other example of the constitution of a linear progressing type actuator using a piezoelectric element.

FIG. 5 is a perspective view showing a second example of an actuator using a piezoelectric element and the actuator is a linear progressing type actuator of a self-propelled type. In FIG. 5, an actuator 30 is constituted by support blocks 31 and 32 fixed to a fixed member, not illustrated, a frictional force generating unit 35 (constituted by a member 35a and a pinching portion 35b) (first member), a guide shaft 33 (second member), a slider block 36 (third member), a piezoelectric element 34 and so on.

The guide shaft 33 is fixedly supported by the support blocks 31 and 32 which are fixed to a fixed member, not illustrated, by screws or the like, by small screws 31a and 32a. One face of the piezoelectric element 34 is fixedly adhered to the member 35a of the frictional force generating unit 35 and other face thereof is fixedly connected to the slider block 36. A driven member, not illustrated, is fixedly coupled to the slider block 36.

A drive system D is constituted by the guide shaft 33, the piezoelectric element 34, the frictional force generating unit 35 and the slider block 36. A driven member, not illustrated, which is fixedly coupled to the slider block 36 of the drive system D is constituted to move relatively to the support blocks 31 and 32.

It is constituted that mass of the frictional force generating unit 35 (first member) is smaller than mass of the slider block 36 (third member) (mass of first member<mass of third member).

The slider block 36 is supported movably in a direction of the guide shaft by being guided by the guide shaft 33 and the slider block 36 may be supported by the guide shaft 33 via a rolling bearing or the like therebetween such that frictional force F1 caused between the slider block 36 and the guide shaft 33 becomes small. Incidentally, numeral 37 designates a screw hole for implanting a coupling pin for coupling the slider block 36 and a driven member, not illustrated.

The frictional force generating unit 35 is constituted by the member 35a fixedly adhered to the piezoelectric element 34 and the pinching portion 35b pinching the guide shaft 33 by predetermined pressure and the pinching portion 35b is frictionally coupled to the guide shaft 33 to constitute a frictional coupling portion Ma. Frictional force F2 at the frictional coupling portion Ma is set to be significantly larger than the frictional force F1 at a sliding portion Mb constituted by the slider block 36 and the guide shaft 33 mentioned above (F2>>F1). The frictional force generating unit 35 may be constituted as light as possible such that a ratio of mass thereof as compared with mass of the slider block 36 is reduced to enable high speed driving.

Next, an explanation will be given of the operation. When a drive pulse in a sawtooth wave having a gradual rise portion and a steep fall portion as shown by FIG. 4(a) is applied on the piezoelectric element 34, at the gradual rise portion of the drive pulse, the piezoelectric element 34 is displaced to elongate gradually in the thickness direction, at this moment, the pinching portion 35b of the frictional force generating unit 35 remains unmoved relative to the guide shaft 33 since the pinching portion 35b of the frictional force generating unit 35 is frictionally coupled to the guide shaft 33 by the frictional force F2 and the slider block 36 is moved in the arrow mark "a" direction by being guided by the guide shaft 33.

At the steep fall portion of the drive pulse, the piezoelectric element 34 is displaced to contract rapidly in the thickness direction. At this moment, reaction of inertia force by which the slider block 36 stays at the position, overcomes the frictional force F2 of the frictional coupling portion Ma and slip is caused at the frictional coupling portion Ma and accordingly, the frictional force generating unit 35 is moved in the arrow mark "a" direction relative to the guide shaft 33 and the slider block 36 remains unmoved.

By continuously applying the drive pulses on the piezoelectric element 34, the slider block 36 can continuously be moved in the arrow mark "a" direction. In moving the slider block in a direction reverse to the previous direction (direction reverse to arrow mark "a"), the movement can be achieved by changing the waveform of the drive pulse in a sawtooth wave applied on the piezoelectric element 34 and applying a drive pulse comprising a steep rise portion and a gradual fall portion as shown by FIG. 4(b).

Figure 6:
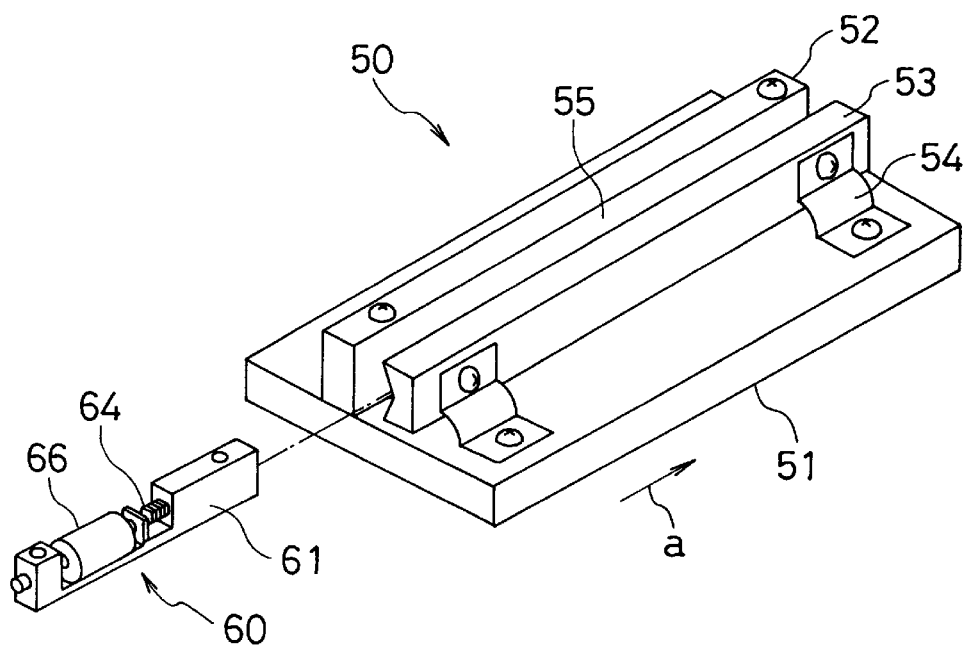
FIG. 6 is a disassembled perspective view showing other example of the constitution of a linear progressing type actuator using a piezoelectric element.
Figure 7:
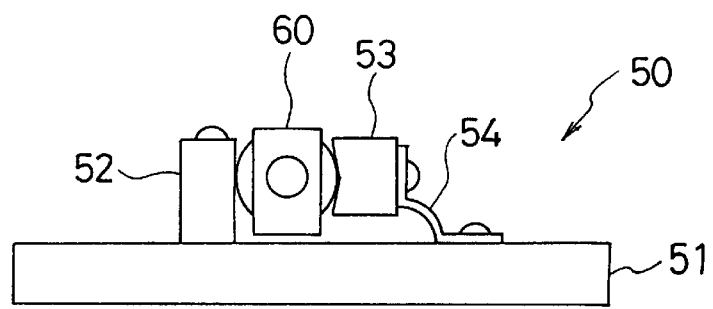
FIG. 7 is a side view of the actuator shown by FIG. 6.
Figure 8:
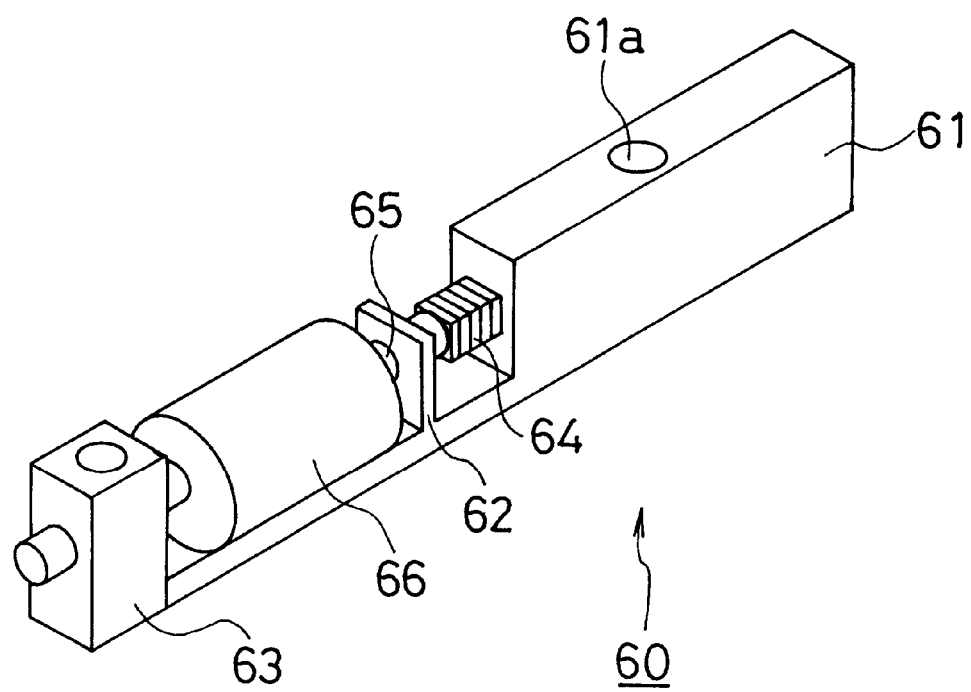
FIG. 8 is a perspective view showing the constitution of a drive unit of the actuator shown by FIG. 6.

FIG. 6 through FIG. 8 show a third example of an actuator using a piezoelectric element and the actuator is also a linear progressing type actuator of a self-propelled type. FIG. 6 is a perspective view showing the constitution of an actuator 50 and showing a state where a drive unit 60 is detached. Further, FIG. 7 is a side view showing a state where the drive unit 60 is mounted to a main body and FIG. 8 is a perspective view showing the constitution of the drive unit 60.

As shown by FIG. 6, the actuator 50 is constituted by a base 51, guide members 52 and 53 installed on the base 51 and the drive unit 60 arranged to be sandwiched by the guide members 52 and 53. The guide member 53 is formed with a groove having a section substantially in a V-like shape, the guide members 52 and 53 are arranged to be separated from each other at a predetermined interval 55 to sandwich a cylindrical body 66 of the drive unit 60, mentioned later, along with the guide member 52 and the guide member 53 is urged toward the cylindrical body 66 by springs 54.

As shown by FIG. 8, the drive unit 60 is constituted by a frame 61, a support member 62 and a support member 63 both integrally formed on the frame 61, a piezoelectric element 64, a drive shaft 65 and the cylindrical body 66.

The drive shaft 65 is integrally fixed with the cylindrical body 66 at its central portion, the drive shaft 65 is supported by the support member 62 and the support member 63 movably in the axial direction and the drive shaft 65 and the cylindrical body 66 can be reciprocated in the axial direction by elongation and contraction displacement of the piezoelectric element 64 in the thickness direction. Further, the frame 61 is provided with an attaching hole 61a for fixing a driven member, not illustrated.

In respect of the drive shaft 65 and the cylindrical body 66 (first member), the cylindrical body 66 is sandwiched by the guide members 52 and 53 (second member), and the guide members 52 and 53 (second member) and the cylindrical body 66 of the drive unit 60 (first member) are frictionally coupled by pertinent frictional force.

One end of the piezoelectric element 64 is fixedly adhered to a side wall of the frame 61 (third member) and the drive shaft 65 is fixedly adhered to other end of the piezoelectric element 64.

It is constituted that the mass of the drive shaft 65 and the cylindrical body 66 (first member) is smaller than the mass of the frame 61 (third member) (mass of first member<mass of third member).

Further, the frame 61 of the drive unit 60 and the support member 62 and the support member 63 both integrally formed on the frame 61 are not brought into contact with the base 51, the guide members 52 and 53 and the frame 61 and only the cylindrical body 66 is brought into contact with the support member 62 and the support member 63 by which the drive unit 60 is held in a floating state.

Next, an explanation will be given of the operation. In a state where the cylindrical body 66 of the drive unit 60 is sandwiched by the guide members 52 and 53 and is frictionally coupled thereto by pertinent frictional force, when a drive pulse of a sawtooth wave having a gradual rise portion and a steep fall portion as shown by FIG. 4(a) is applied on the piezoelectric element 64, at the gradual rise portion of the drive pulse, the piezoelectric element 64 is displaced to elongate gradually in the thickness direction, at this moment, the cylindrical body 66 and the guide members 52 and 53 are frictionally coupled with each other and therefore, the cylindrical body 66 remains unmoved relative to the guide members 52 and 53 and the frame 61 is moved in an arrow mark "a" direction.

At the steep fall portion of drive pulse, the piezoelectric element 64 is displaced to contract rapidly in the thickness direction. At this moment, inertia force by which the frame 61 stays at the position overcomes the frictional coupling force between the cylindrical body 66 and the guide members 52 and 53 and accordingly, slip is caused between the cylindrical body 66 and the guide members 52 and 53 and the frame 61 remains unmoved.

By continuously applying the drive pulses on the piezoelectric element 64, the frame 61, that is, the drive unit 60 can continuously be moved in the arrow mark "a" direction. In moving the drive unit 60 in a direction reverse to the previous direction (direction reverse to arrow mark "a"), the waveform of drive pulse of the sawtooth wave applied on the piezoelectric element 64 is changed and a drive pulse comprising a steep rise portion and a gradual fall portion as shown by FIG. 4(b) may be applied.

Figure 9:
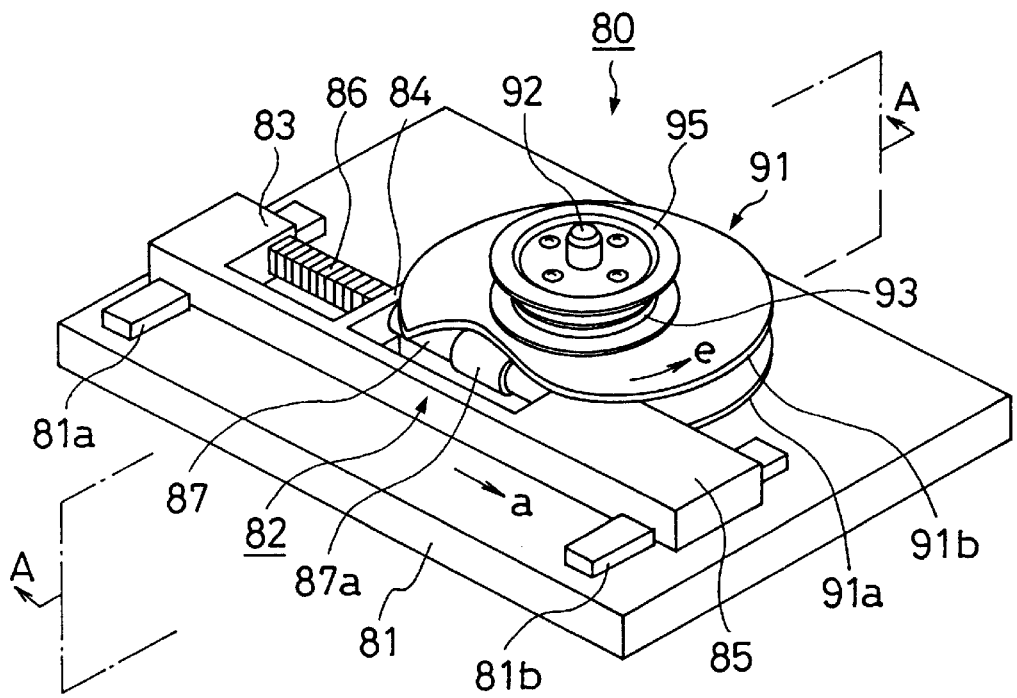
FIG. 9 is a perspective view showing the constitution of a rotary type actuator using a piezoelectric element.
Figure 10:
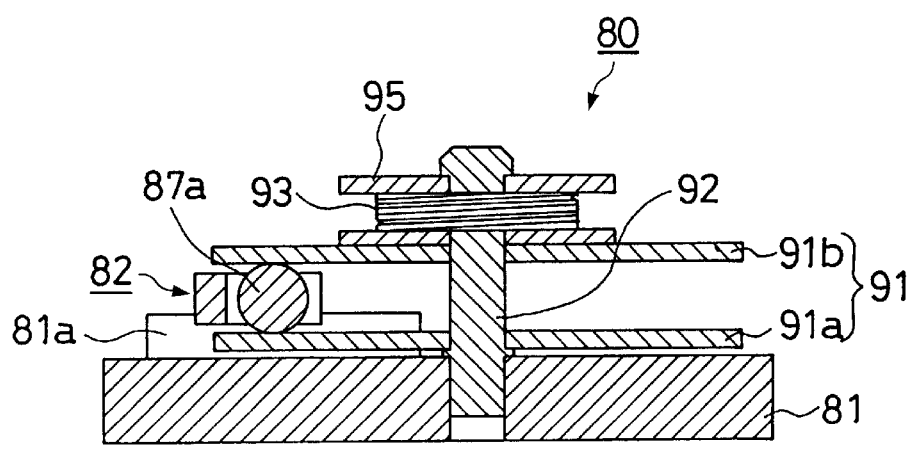
FIG. 10 is a sectional view taken along a face A—A of the actuator shown by FIG. 6.

FIG. 9 and FIG. 10 show a fourth embodiment of an actuator using a piezoelectric element and the actuator is a rotary type actuator. FIG. 9 is a perspective view of a rotary type actuator and FIG. 10 is a sectional view taken along a face A—A of FIG. 9.

In the following, an explanation will be given in reference to FIG. 9 and FIG. 10. A rotary type actuator 80 is constituted by a base 81, guide members 81a and 81b installed on the base 81, a frame 82 (third member), a piezoelectric element 86, a drive shaft 87 (first member), a friction disk wheel 91 and an output rotating shaft 92 (both constituting a second member) and so on.

It is constituted that the mass of the drive shaft (first member) is smaller than the mass of the frame 83 (third member) (mass of first member<mass of third member).

The frame 82 is slidably supported along the guide members 81a and 81b installed on the base 81 and is constituted to be movable in a direction approaching the output rotating shaft 92 of the friction disk wheel 91 and a direction separating therefrom. Further, the frame 82 is formed with the support blocks 83, 84 and 85 and the drive shaft 87 is supported by the support block 84 and the support block 85 movably in the axial direction.

One end of the piezoelectric element 86 is fixedly adhered to the support block 83 and other end of the piezoelectric element 86 is fixedly adhered to one end of the drive shaft 87. By such a constitution, when displacement in the thickness direction is caused in the piezoelectric element 86, the drive shaft 87 can freely be displaced in the axial direction (arrow mark "a" direction and direction reverse thereto).

The drive shaft 87 is provided with a circular section and is frictionally coupled to the friction disk wheel 91, mentioned later, a large diameter portion 87a the outer diameter of which is larger than that in other portion, is constituted at a central portion of the drive shaft 87 and the large diameter portion 87a of the drive shaft 87 is constituted to frictionally couple to friction disks 91a and 91b. Thereby, peripheral portions of the friction disks 91a and 91b are not brought into contact with the drive shaft 87 and accordingly, reciprocating oscillation of the drive shaft 87 is not hampered. The large diameter portion 87a may be integrally formed by the same material by making a portion of the drive shaft 82 to constitute a portion having a large diameter as it is or may be constituted by fitting a friction member which is lightweighted and highly rigid to the drive shaft 87. Otherwise, it can be constituted by fitting a pertinent friction member, for example, a cylindrical member made of hard rubber or the like.

The friction disk wheel 91 is constituted by the friction disk 91a fixed to the output rotating shaft 92 and the friction disk 91b insertingly fitted to the output rotating shaft 92, rotated along with the output rotating shaft 92 and movable in the axial direction. The friction disk 91b is urged toward the friction disk 91a by a spring 93. Further, numeral 95 designates a hold plate holding the spring 93. The drive shaft 87 is interposed between the friction disks 91a and 91b and is arranged such that the friction disks 91a and 91b and the large diameter portion 87a at the central portion of the drive shaft 87 are frictionally coupled as explained above.

Next, an explanation will be given of the operation. First, when a drive pulse of a sawtooth wave having a gradual rise portion and a steep fall portion as shown by FIG. 4(a) is applied on the piezoelectric element 86, at the gradual rise portion of the drive pulse, the piezoelectric element 86 is displaced to elongate gradually in the thickness direction and the drive shaft 87 coupled to the piezoelectric element 86 is displaced to linearly progress gradually in a positive direction (arrow mark "a" direction). As a result, a frictionally coupled portion of the friction disk wheel 91 frictionally coupled to the drive shaft 87 receives force in the tangential direction (force in arrow mark "a" direction) and accordingly, the friction disk wheel 91 is rotated around the output rotating shaft 92 in the positive direction (counterclockwise direction in FIG. 4, arrow mark "e" direction).

At the steep rise portion of the drive pulse, the piezoelectric element 86 is displaced to contract rapidly in the thickness direction and the drive shaft 87 coupled with the piezoelectric element 86 is also displaced rapidly in a negative direction (direction reverse to arrow mark "a"). At this moment, the friction disk wheel 91 frictionally coupled to the drive shaft 87 overcomes the frictional coupling force by inertia force, substantially remains at the position and is not rotated. By continuously applying the drive pulses on the piezoelectric element 86, reciprocating oscillation having different speeds is caused at the drive shaft 87 by which the friction disk wheel 91, that is, the output rotating shaft 92 can continuously be rotated in the positive direction (counterclockwise direction in FIG. 4, arrow mark "e" direction).

In rotating the friction disk wheel 91 in a direction reverse to the previous direction (clockwise direction in FIG. 4, direction reverse to arrow mark "e"), the waveform of the drive pulse in a sawtooth wave applied on the piezoelectric element 86 is changed and a drive pulse comprising a steep rise portion and a gradual fall portion as shown by FIG. 4(b) is applied.

In order to change a rotational number of the output rotating shaft 92, that is, a rotational number of the friction disk wheel 91, the position of the frame 82 on the base 81 is changed and an interval between the drive shaft 87 and the output rotating shaft 92 is changed. Thereby, a radius of a position where the drive shaft 87 is brought into frictional contact with the friction disk wheel 91 is changed and accordingly, even when the speed of reciprocating movement of the drive shaft 87 remains constant, the rotational number of the friction disk wheel 91, that is, the rotational number of the output rotating shaft 92 can be changed.

Although according to the four embodiments explained above, the first member and the second member are constituted such that mass of the first member is smaller than mass of the third member (mass of first member<mass of third member), mass of the first member may not necessarily be constituted smaller than mass of the third member.

Next, an explanation will be given of the characteristics of drive pulse for driving a piezoelectric element. First, an explanation will be given of a relationship between frequency of drive pulse and drive speed. Incidentally, an explanation will be given here of a piezoelectric element as an example of an electromechanical transducer and the same goes with other electromechanical transducer.

Figure 11:
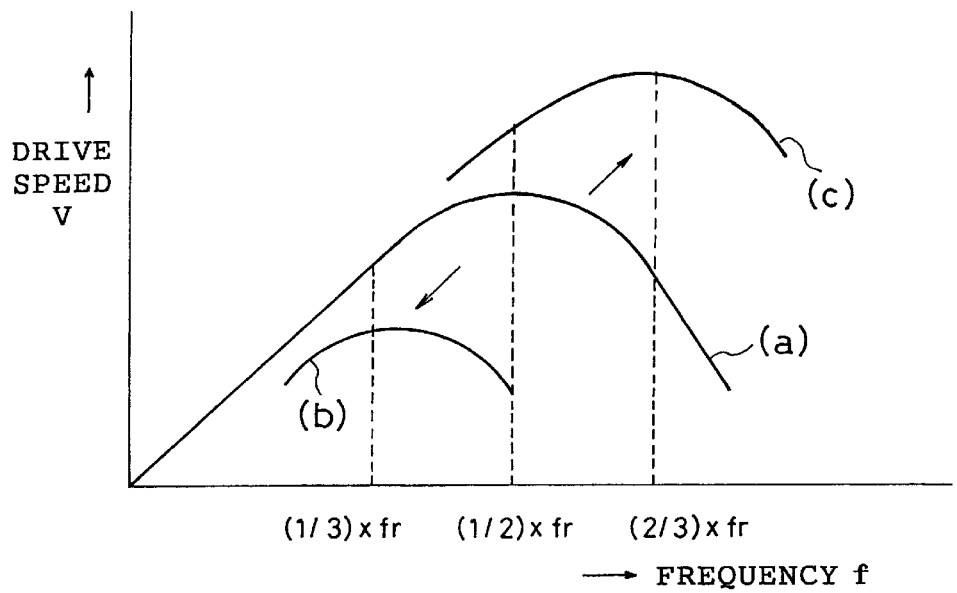
FIG. 11 is a diagram showing a relationship between frequency and drive speed of a drive pulse.

FIG. 11 is a diagram showing a result of measuring a relationship between a frequency "f" of a drive pulse and a drive speed V while varying load in respect of various actuators using piezoelectric elements in which line (a) indicates a relationship between the frequency of the drive pulse and the drive speed in the case where constant load is applied as a reference. Further, line (b) shows a relationship between the frequency of the drive pulse and the drive speed in the case where large load is applied and line (c) indicates a relationship between the frequency of the drive pulse and the drive speed in the case of no load.

As is apparent from the figure, it is known that the peak value of the drive speed is disposed at a vicinity of ½ of a resonance frequency fr of a drive system including a piezoelectric element and when the load becomes large, the peak value is shifted to the low frequency side and when the load becomes small, it is shifted to the high frequency side. Accordingly, it is conceived to be preferable that a drive frequency capable of carrying out proper high speed driving is set in a range of from ⅓ to ⅔ of the resonance frequency fr considering a variation in the load, that is, the frequency "f" of the drive pulse is set in a range of:

$$(1/3)fr < f < (2/3)fr \quad (1)$$

when the resonance frequency of the piezoelectric element attached with the first member and the third member at its both ends is designated by notation fr.

Figure 12:
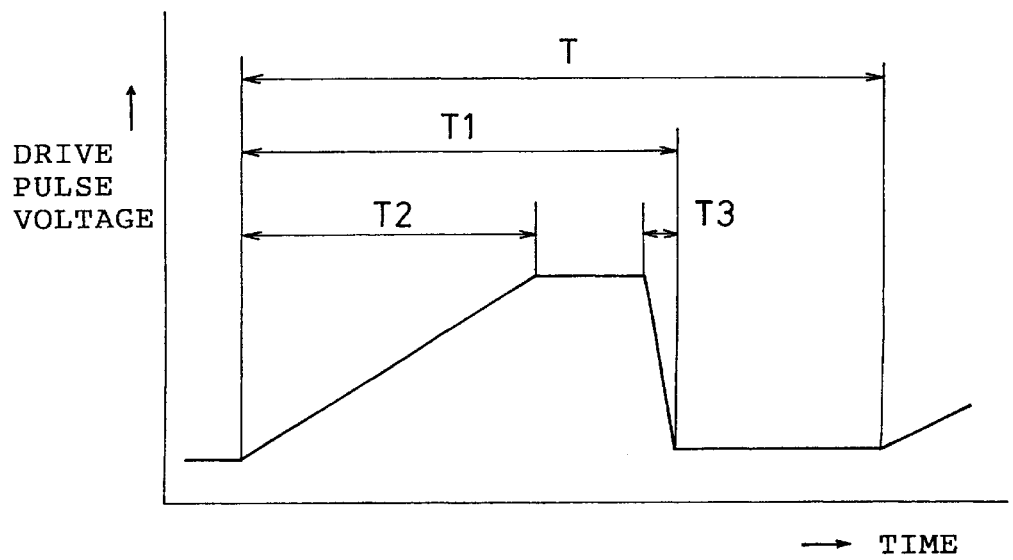
FIG. 12 is a diagram for explaining parameters of a waveform of a drive pulse.

Next, an explanation will be given of waveform of a drive pulse. FIG. 12 is a diagram for explaining parameters of waveform of a drive pulse in which the waveform of a drive pulse is basically a sawtooth waveform, the wave length is designated by notation T, a width of the drive pulse (width from rise to fall) is designated by notation T1, a width of a gradually changing portion of drive pulse voltage is designated by notation T2 and a width of a rapidly changing portion thereof is designated by notation T3.

Optimum values of the width T1 of the drive pulse, the width T2 of the gradually changing portion of drive pulse voltage and the width T3 of the rapidly changing portion are provided by an experiment within a range satisfying equation (1) mentioned above.

Specifically, a ratio (T1/T) of the drive pulse width T1 to the drive pulse wavelength T and a ratio (T2/T) of the width T2 of the gradually changing portion of drive pulse voltage to the drive pulse width T1 are changed in a range of 0.1 through 1.0, the drive speed of the actuator in that case is measured and preferable ranges of the ratio (T1/T) and the ratio (T2/T1) are determined. Further, in respect of the width T3 of the rapidly changing portion of drive pulse voltage, it is theoretically preferable that the width T3 is short and accordingly, in this case, the width T3 is set to be as short as possible.

An explanation will be given of a result of the experiment as follows. The experiment is carried out with respect to the actuator shown by FIG. 1 through FIG. 3. The resonance frequency fr is 57 kHz and preferable waveforms are provided with respect to three different drive pulses having frequencies lower than the resonance frequency fr.

Figure 13:
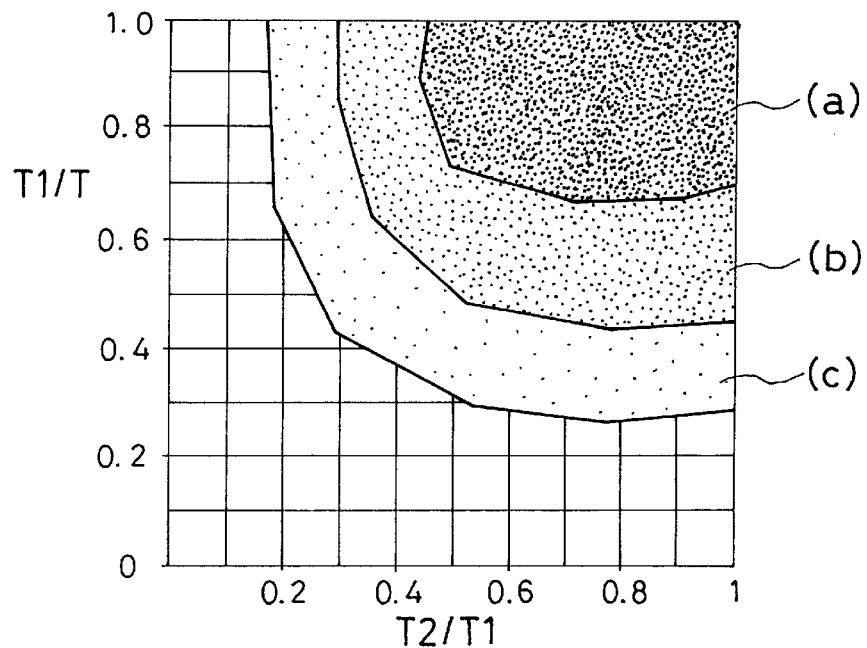
FIG. 13 is a diagram showing a relationship between a ratio of drive speed to maximum speed and a ratio of a drive pulse width T1 to a drive pulse wavelength T in the case where a frequency "f" of drive pulse is sufficiently lower than a resonance frequency fr.

FIG. 13 shows a case in which the frequency "f" of the drive pulse is 5 kHz which is sufficiently lower than the resonance frequency fr (57 kHz) in which a region (a) shows a region in which a ratio of the drive speed to a maximum speed in the case of 5 kHz falls in a range of 75 through 100%, a region (b) shows a region where it falls in a range of 50 through 75% and a region (c) shows a region where it falls in a range of 25 through 50%.

Figure 14:
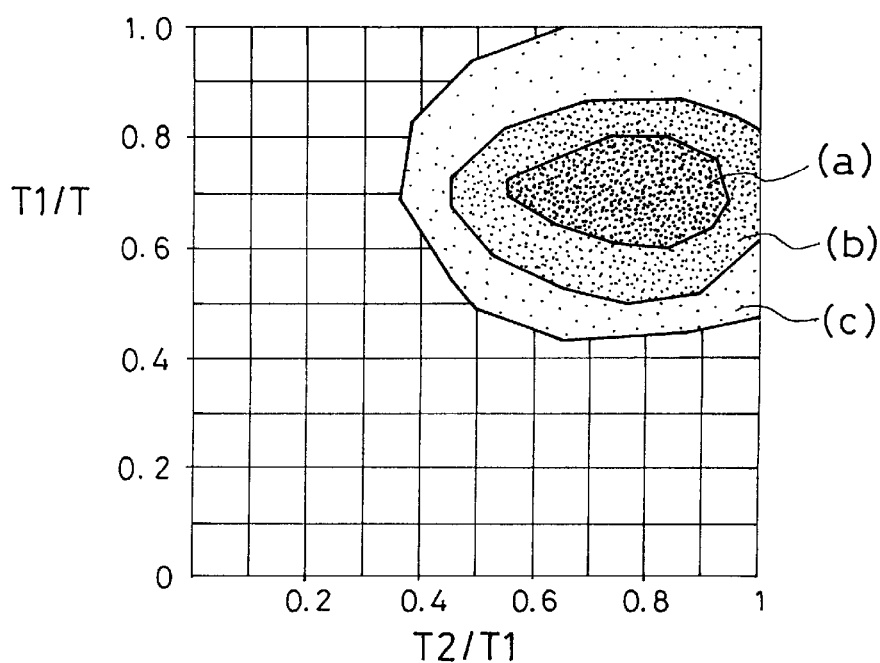
FIG. 14 is a diagram showing a relationship between a ratio of drive speed to maximum speed and a ratio of a drive pulse width T1 to a drive pulse wavelength T in the case where a frequency "f" of drive pulse is slightly higher than ⅓ of the resonance frequency fr.

FIG. 14 shows a case in which the frequency "f" of the drive pulse is 20 kHz which is slightly higher than ⅓ of the resonance frequency fr (57 kHz) in which a region (a) shows a region where a ratio of the drive speed the highest speed falls in a range of 75 through 100% in the case of the frequency "f" of 20 kHz, a region (b) shows a region where it falls in a range of 50 through 75% and a region (c) shows a region where it falls in a range of 25 through 50%.

Figure 15:
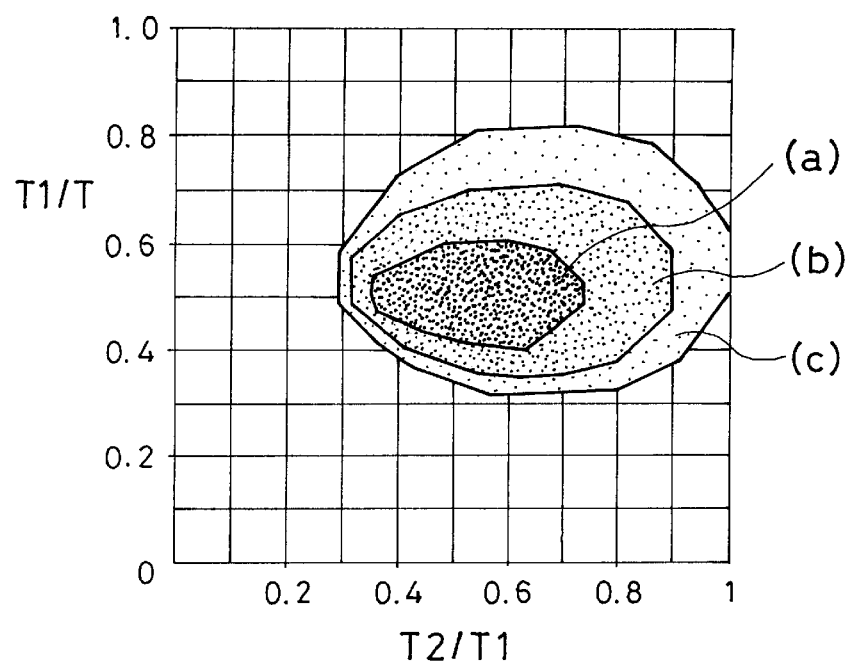
FIG. 15 is a diagram showing a relationship between a ratio of drive speed to maximum speed and a ratio of a drive pulse width T1 to a drive pulse wavelength T in the case where a frequency "f" of drive pulse is slightly lower than ⅔ of a resonance frequency fr.

FIG. 15 shows a case in which the frequency "f" of the drive pulse is 35 kHz which is slightly lower than ⅔ of the resonance frequency fr (57 kHz) in which a region (a) shows a region where a ratio of the drive speed to the highest speed falls in a range of 75 through 100% in the case of the frequency "f" of 35 kHz, a region (b) shows a region where it falls in a range of 50 through 75% and a region (c) shows a region where it falls in a range of 25 through 50%.

In view of the experimental result, in the case where the frequency "f" of the drive pulse is sufficiently lower than the resonance frequency fr, high speed driving can be carried out when the ratio (T1/T) of the drive pulse width T1 to the drive pulse wavelength T falls in a range of 0.7 through 1.0 and the ratio (T2/T1) of the width T2 at the gradually changing portion of the drive pulse voltage to the drive pulse width T1 falls in a range of 0.5 through 1.0.

Further, as the frequency "f" becomes proximate to the resonance frequency fr, the ratio (T1/T) by which high speed driving can be carried out becomes small and is moved to a range of 0.4 through 0.8 and the ratio (T2/T1) is moved to a range of 0.35 through 0.95.

Figure 16:
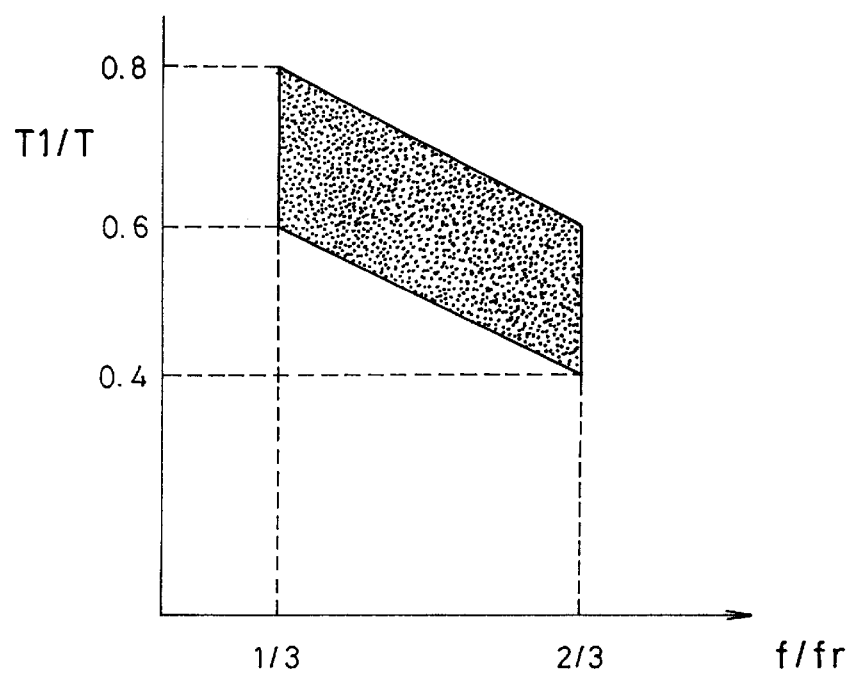
FIG. 16 is a diagram showing a relationship between a ratio (f/fr) of a frequency "f" of drive pulse to a resonance frequency fr and a ratio (T1/T) of a drive pulse width T1 to a drive pulse wavelength T.

FIG. 16 shows a relationship between a ratio (f/fr) of the frequency "f" of the drive pulse to the resonance frequency fr and the ratio (T1/T) of the drive pulse width T1 to the drive pulse wavelength T, showing that proper high speed driving can be carried out with the ratio (f/fr) in a range of ⅓ through ⅔ and with the ratio (T1/T) in a range of 0.4 through 0.8 (0.4<(T1/T)<0.8).

Figure 17:
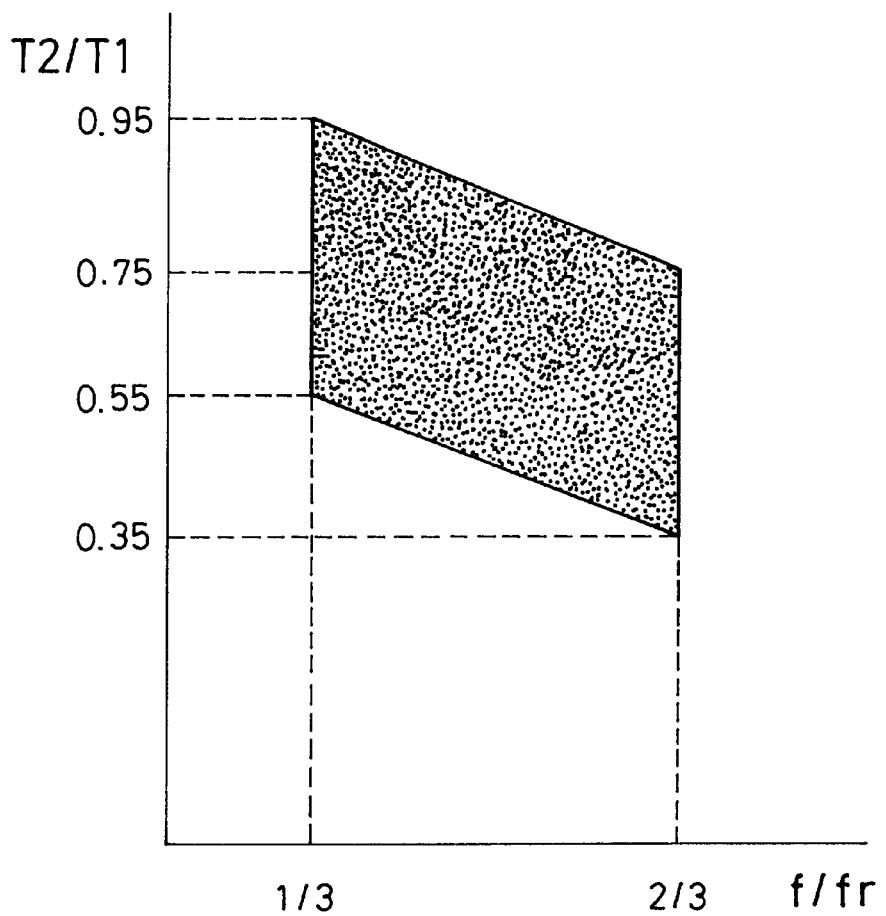
FIG. 17 is a diagram showing a relationship between a ratio (f/fr) of a frequency "f" of drive pulse to a resonance frequency fr and a ratio (T2/T1) of a width T2 of a gradually changing portion of drive pulse voltage.

Further, FIG. 17 shows a relationship between the ratio (f/fr) of the frequency "f" of the drive pulse to the resonance frequency fr and the ratio (T2/T1) of the width T2 of the gradually changing portion of the drive pulse voltage to the drive pulse width T1, showing that proper high speed driving can be carried out with the ratio (f/fr) in a range of ⅓ through ⅔ and with the ratio (T2/T1) in a range of 0.35 through 0.95 (0.35<(T2/T1)<0.95).

Next, an explanation will be given of an optimum value of the width T3 of the rapidly changing portion of the drive pulse voltage. Although it is preferable that the width T3 of the rapidly changing portion of the drive pulse voltage is theoretically null, actually, it cannot be made null. Hence, T1 and T2 are set from the ratio (T2/T1) of the width T2 of the gradually changing portion of the drive pulse voltage to the drive pulse width T1 by which proper high speed driving can be carried out and which has been provided previously, a ratio (T3/T2) of the width T2 of the gradually changing portion of the drive pulse voltage to the width T3 of the rapidly changing portion of the drive pulse voltage, is varied in a range of 0.1 through 1.0 and the drive speed is measured. In this case, it is natural that a total of the width T2 of the gradually changing portion of the drive pulse voltage and the width T3 of the rapidly changing portion is smaller than the drive pulse width T1 (T2+T3<T1).

Figure 18:
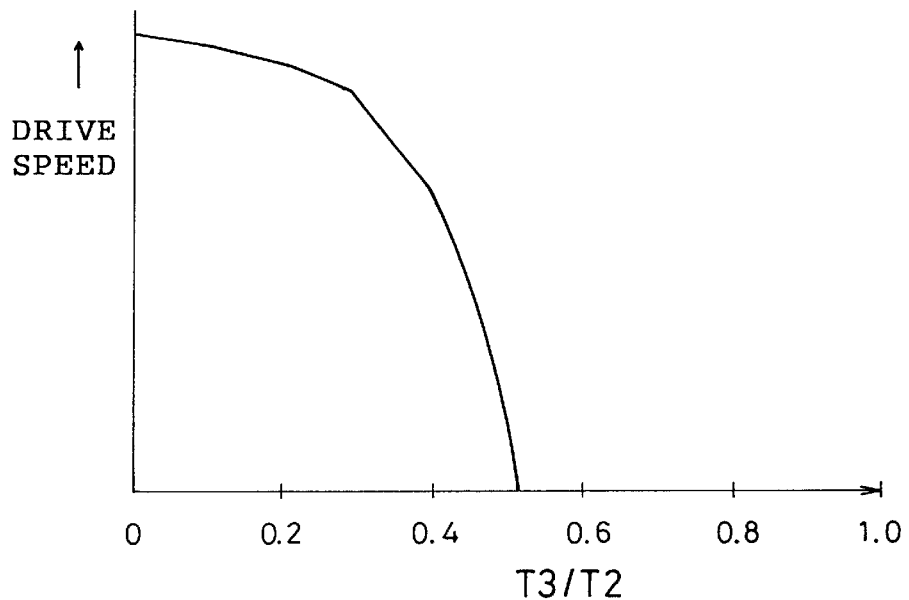
FIG. 18 is a diagram showing a relationship between a ratio (T3/T2) of a width T3 of a rapidly changing portion of drive pulse voltage to a width T2 of a gradually changing portion thereof and drive speed.

FIG. 18 shows a result of measuring the drive speed in respect of the ratio (T3/T2) in which the more proximate the ratio (T3/T2) to null, the faster the drive speed and when the ratio (T3/T2) is 0.5, the drive speed becomes null. In view of the result, a proper value of the ratio (T3/T2) seems to be lower than 0.4 ((T3/T2)<0.4).

Figure 19:
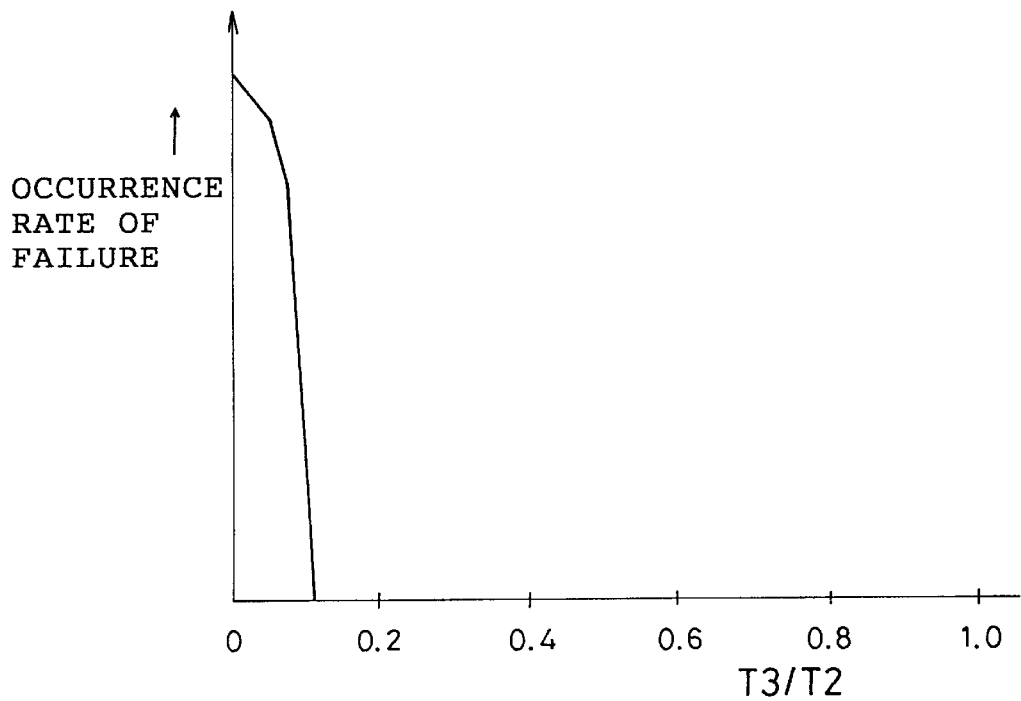
FIG. 19 is a diagram showing a relationship between a ratio (T3/T2) of a width T3 of a rapidly changing portion of drive pulse voltage to a width T2 of a gradually changing portion thereof and a failure rate.

Further, an occurrence rate of failure such as peeling off of a portion bonding the piezoelectric element and the drive shaft (first member) or the like is also measured in respect of the ratio (T3/T2) of the width T3 of the rapidly changing portion of the drive pulse voltage to the width T2 of the gradually changing portion thereof. FIG. 19 shows a measurement result of a failure occurrence rate in respect of the ratio (T3/T2) in which the more proximate the ratio (T3/T2) to null, the higher the failure occurrence rate and when the ratio (T3/T2) is 0.1 or higher, the failure occurrence rate becomes null. In view of the result, to suppress occurrence of failure, the ratio (T3/T2) is preferably higher than 0.1 ((T3/T2)>0.1).

Summarizing the above-described experimental result, the drive pulse generating apparatus is an apparatus for generating a drive pulse of a sawtooth wave satisfying conditions explained below. A circuit may have any circuit constitution so far as the pulse generating apparatus satisfies the conditions. The conditions of a drive pulse are as follows.

The frequency "f" of the drive pulse is set to satisfy the following equation (1):

$$(1/3)fr<f<(2/3)fr \quad (1)$$

where f: frequency of drive pulse, fr: resonance frequency of a piezoelectric element attached with a first member and a third member at both ends thereof.

Further, the wavelength T of the drive pulse is set in a range satisfying the following equations (2), (3) and (4):

$$0.4<(T1/T)<0.8 \quad (2)$$

$$0.35<(T2/T1)<0.95 \quad (3)$$

$$0<(T3/T2)<0.3 \quad (4)$$

where

T: wavelength of drive pulse (=1/f),

T1: drive pulse width,

T2: width of a gradually changing portion of drive pulse voltage,

T3: width of a rapidly changing portion of drive pulse voltage.

Further, when the ratio (T3/T2) of the width T3 of the rapidly changing portion of the drive pulse voltage to the width T2 of the gradually changing portion thereof is set in a range satisfying the following equation (5), an occurrence ratio of failure such as peeling off of a portion bonding the piezoelectric element and the first member can significantly be lowered and reliability of the actuator can be promoted.

$$0.1<(T3/T2)<0.3 \quad (5)$$

Although according to the embodiments explained above, an explanation has been given of the case where the resonance frequency fr is 57 kHz, similar result can be obtained in the case where the resonance frequency is 100 kHz or other case.

Further, although the experimental result explained above is the experimental result with respect to the linear progressing type actuator shown by FIG. 1 through FIG. 3, similar experimental result has been obtained also with respect to the linear progressing type actuator shown by FIG. 5, the linear progressing type actuator shown by FIG. 6 through FIG. 8 and the rotary type actuator shown by FIG. 9 and FIG. 10.

That is, by setting the frequency "f" of the drive pulse of a sawtooth wave to satisfy Equation (1) and setting the wavelength T in a range satisfying the equations (2), (3) and (4), an actuator using the electromechanical transducer can be driven efficiently and at high speed.

Further, when the ratio (T3/T2) of the width T3 of the rapidly changing portion of the drive pulse voltage of the sawtooth wave to the width T2 of the gradually changing portion thereof is set to a range satisfying Equation (5), an occurrence ratio of failure such as peeling off of a portion bonding the electromechanical transducer and the first member can significantly be lowered and an actuator using a highly reliable electromechanical transducer can be provided.

What is claimed is:

1. An actuator, comprising:

an electromechanical transducer for repeatedly producing linear displacement in a predetermined direction;

a first member fixedly coupled to one end of said electromechanical transducer;

a second member frictionally coupled to said first member, said first member and said second member being moveable in the predetermined direction; and a drive pulse generating means for supplying a drive pulse to said electromechanical transducer, wherein said drive pulse has the shape of a sawtooth waveform having a gradually changing portion and a rapidly changing portion, said drive pulse satisfying the following equations (a) and (b):

$$0.4<(T1/T)<0.8 \quad (a)$$

$$0.35<(T2/T1)<0.95 \quad (b)$$

wherein T is a wavelength of the drive pulse;

T1 is a pulse width of the drive pulse; and

T2 is a width of the gradually changing portion of the drive pulse.

2. An actuator in accordance with claim 1, wherein said drive pulse further satisfies the following equation (c):

$$(1/3)\times fr<f<(2/3)\times fr \quad (c)$$

wherein f is a frequency of the drive pulse; and fr is a resonance frequency of the electromechanical transducer and related drive member in the actuator.

3. An actuator in accordance with claim 2, wherein said drive pulse further satisfies the following equation (d):

$$0<(T3/T2)<0.3 \quad (d)$$

wherein T2 is a width of the gradually changing portion of the drive pulse; and

T3 is a width of the rapidly changing portion of the drive pulse.

4. An actuator in accordance with claim 1, wherein another end of said electromechanical transducer is fixed to a main body of the actuator, and said second member is moveable in said predetermined direction by repeated reciprocating movement of the first member in accordance with the displacement of said electromechanical transducer.

5. An actuator in accordance with claim 1, wherein said second member is fixed to a main body of the actuator, and said first member and electromechanical transducer are moveable in relation to the main body of the actuator as a result of the repeated reciprocating movement of said first member in accordance with the displacement of said electromechanical transducer.

6. An actuator, comprising:

an electromechanical transducer for repeatedly producing linear displacement in a predetermined direction;

a first member fixedly coupled to one end of said electromechanical transducer;

a second member frictionally coupled to said first member, said first member and said second member being moveable in the predetermined direction; and a drive pulse generating means for supplying a drive pulse to said electromechanical transducer, wherein said drive pulse has a sawtooth waveform shape having a gradually changing portion and a rapidly changing portion, said drive pulse satisfying the following equation (d):

$$0 < (T3/T2) < 0.3 \tag{d}$$

wherein T2 is a width of the gradually changing portion of the drive pulse; and

T3 is a width of the rapidly changing portion of the drive pulse.

7. An actuator in accordance with claim 6, wherein said drive pulse further satisfies the following equation (c):

$$(1/3) \times fr < f < (2/3) \times fr \tag{c}$$

wherein f is a frequency of the drive pulse; and fr is a resonance frequency of the electromechanical transducer and related drive member in the actuator.

8. A method for driving an actuator having an electromechanical transducer for repeatedly producing linear displacement in a predetermined direction as a result of supplying drive pulses, said drive method comprising steps of:

alternately supplying a first electric current and a second electric current to said transducer and applying said first and second electric currents in predetermined frequency f, said first electric current producing a gradual displacement of said transducer in a first direction, said second electric current producing a rapid displacement of said transducer in a second direction reverse to the first direction;

wherein the following equations (a) and (b) are satisfied:

$$0.4 < (T1/T) < 0.8 \tag{a}$$

$$0.35 < (T2/T1) < 0.95 \tag{b}$$

wherein T is a time interval of one cycle of drive pulse and is equal to 1/f;

T1 is a time interval between starting a supply of one occurrence of said first current and finishing of a supply of an adjacent occurrence of said second current; and T2 is a time interval between starting and finishing of a supply of one occurrence of said first current.

9. A method for driving an actuator in accordance with claim 8, wherein the following equation (c) is additionally satisfied:

$$(1/3) \times fr < f < (2/3) \times fr \tag{c}$$

wherein fr is a resonance frequency of the electromechanical transducer and related drive member in the actuator.

10. A method for driving an actuator in accordance with claim 8, wherein the following equation (d) is additionally satisfied:

$$0 < (T3/T2) < 0.3 \tag{d}$$

wherein T3 is a time interval between starting and finishing of a supply of one occurrence of said second current.

11. A method for driving an actuator having an electromechanical transducer for repeatedly producing linear displacement in a predetermined direction as a result of supplying drive pulses, said drive method comprising steps of:

alternately supplying a first electric current and a second electric current to said transducer and applying said first and second electric currents in predetermined frequency f, said first electric current producing a gradual displacement of said transducer in a first direction, said second electric current producing a rapid displacement of said transducer in a second direction reverse to the first direction;

wherein the following equation (d) is satisfied:

$$0 < (T3/T2) < 0.3 \tag{d}$$

wherein T2 is a time interval between starting and finishing of a supply of one occurrence of said first current; and T3 is a time interval between starting and finishing of a supply of one occurrence of said second current.

\* \* \* \* \*

UNITED STATES PATENT AND TRADEMARK OFFICE
CERTIFICATE OF CORRECTION

PATENT NO. : 6,218,764 B1
DATED : April 17, 2001
INVENTOR(S) : Ryuichi Yoshida et al.

It is certified that error appears in the above-identified patent and that said Letters Patent is hereby corrected as shown below:

Title Page, Item [54] and Column 1, lines 1-4,
Delete "ACTUATOR USING ELECTROMECHANICAL TRANSDUCER AND DRIVE PULSE GENERATOR SUITABLE THEREOF", and insert --ACTUATOR USING AN ELECTROMECHANICAL TRANSDUCER AND DRIVE PULSE GENERATOR SUITABLE THEREFOR --.

Column 1,
Line 7, delete "is", and insert -- are --.
Line 19, delete "light-weighted", and insert -- light weight --.
Line 20, delete "positioning, there", and insert -- positioning. There --.
Line 20, after "applicant", insert -- , --.
Line 32, delete the third instance of "the".
Line 33, before "drive", insert -- resulting --.
Line 33, delete "relationship, when", and insert -- relationship. When --.
Line 35, delete "is decreased", and insert -- decreases --.
Line 36, after "is", insert -- further --.
Line 39, delete "principal".
Line 41, after "driving", insert -- efficiently and --.
Line 41, after "speed", delete "and efficiently".
Line 51, delete "object", and insert -- objects --.
Line 52, after "from", delete "a" and insert -- the following --.
Lines 55 and 56, delete "showing the constitution".
Lines 60 and 62, delete "by", and insert -- of --.
Line 61, delete "showing the constitution".
Line 65, delete "other" and insert -- another --.
Line 66, delete "of the constitution".

Column 2,
Line 1, delete "other", and insert -- another --.
Line 2, delete "of the constitution".
Lines 4, 6 and 11, delete "by", and insert -- in --.
Line 7, delete "the constitution of".
Lines 19, 24, 30 and 33, delete "pulse", and insert -- pulses --.
Line 37, delete "pulse", and insert -- pulses --.
Line 52, after "given", insert -- next --.
Line 59, delete "and", and insert -- where --.

UNITED STATES PATENT AND TRADEMARK OFFICE
CERTIFICATE OF CORRECTION

PATENT NO. : 6,218,764 B1
DATED : April 17, 2001
INVENTOR(S) : Ryuichi Yoshida et al.

It is certified that error appears in the above-identified patent and that said Letters Patent is hereby corrected as shown below:

Column 3,
Line 17, after "is", insert -- movably --.
Line 19, delete "movably".
Line 20, delete "in the axial direction and the", and insert -- so as to be movable in the axial direction. The --.
Line 25, after "3", insert -- which --.
Line 25, delete "projected", and insert -- projects --.
Line 27, delete "to", and insert -- towards --.
Line 27, after "by", insert -- a --.
Line 28, delete "and", and insert -- where --.
Line 31, before "frictionally", insert -- which is --.
Line 32, after "fixing", insert -- to --.
Line 35, after "4d", insert -- , --.
Line 36, after "penetrates", insert -- , --.
Line 47, after "shape", insert -- , --.

Column 4,
Lines 1, 3 and 36, delete "rise", and insert -- rising --.
Lines 2, 13 and 37, delete "fall", and insert -- falling --.
Lines 6, 8, 10, 16, 23, 24, 33, 35 delete "mark", and insert -- marked --.
Line 6, delete "in the axial direction.", and insert -- (i.e., in the axial direction.) --.
Lines 7 and 17, after "4", insert -- which is --.
Lines 9 and 10, delete "can be", and insert -- is --.
Line 10, delete "Further, an", and insert -- An --.
Lines 18 and 19, after "overcoming", insert -- the --.
Line 20, delete "signifies to".
Line 21, delete "include", and insert -- includes --.
Line 23, after "direction", insert -- , --.
Line 23, after "whole", insert -- , --.
Line 24, delete "and", and insert -- or --.
Line 25, delete "What", and insert -- The --.
Line 25, after "mode", insert -- which --.
Line 26, after "about", delete ",".
Line 29, delete "on", and insert -- to --.
Line 31, after the first instance of "4", insert -- , --.
Line 31, after the second instance of "4", insert -- , --.
Line 35, after "applying", insert -- to the piezoelectric element --.

UNITED STATES PATENT AND TRADEMARK OFFICE
CERTIFICATE OF CORRECTION

PATENT NO. : 6,218,764 B1
DATED : April 17, 2001
INVENTOR(S) : Ryuichi Yoshida et al.

It is certified that error appears in the above-identified patent and that said Letters Patent is hereby corrected as shown below:

Column 4 (cont'd),
Lines 37 and 38, after "4(b)", delete "on the piezoelectric element"
Line 40, delete "and", and insert --where--.
Line 49, delete ", by screws or the like,".
Line 50, after "32a", delete ".", and insert --, or the like. --.
Line 60, delete "relatively", and insert --in relation--.
Line 62, delete "that mass", and insert --so that the mass--.
Line 63, after "than", insert --the--.
Line 66, delete "supported".
Line 66, delete "in", and insert --supported along--.
Line 67, after "33", insert --,--.

Column 5,
Line 3, delete "caused", and insert -- resulting --.
Line 10, delete "pressure and the", and insert -- pressure. The --.
Lines 21, 23 and 50, delete "rise", and insert -- rising --.
Lines 22, 33 and 51, delete "fall", and insert -- falling --.
Line 22, after "4(a)", insert -- , --.
Lines 23 and 42, delete "on", and insert -- to --.
Line 25, delete "direction, at", and insert -- direction. At --.
Lines 31, 40 and 44, delete "mark", and insert -- marked --.
Line 35, after "moment,", delete "reaction", and insert -- as a result --.
Line 36, delete "by which".
Line 36, after "position,", delete "overcomes".
Line 37, before "the frictional force", insert -- because --.
Lines 37 and 38, after "Ma", delete "and slip", and insert -- is overcome and a slip --.
Line 38, after "Ma", delete "and", and insert -- . --.
Line 39, delete "accordingly," and insert -- Accordingly --.
Line 53, delete "and", and insert -- when --.
Line 63, after "arranged", insert -- so as --.

Column 6,
Line 28, after "constituted", insert -- so --.
Line 33, after "63", insert -- , --.
Line 34, after "61 ", insert -- , --.
Line 42, after "by", insert -- the --.
Lines 43 and 45, delete "rise", and insert -- rising --.
Lines 44 and 53, delete "fall", and insert -- falling --.
Line 44, after "4(a)", insert -- , --.
Lines 45 and 66, delete "on", and insert -- to --.

UNITED STATES PATENT AND TRADEMARK OFFICE
CERTIFICATE OF CORRECTION

PATENT NO. : 6,218,764 B1
DATED : April 17, 2001
INVENTOR(S) : Ryuichi Yoshida et al.

It is certified that error appears in the above-identified patent and that said Letters Patent is hereby corrected as shown below:

Column 6 (cont'd),
Line 47, delete "direction, at", and insert -- direction. At --.
Line 51, after "53", insert -- , --.
Lines 52, 63 and 65, delete "mark", and insert -- marked --.
Line 55, after "force", insert -- , --.
Line 56, after "position", insert -- , --.
Line 58, after "accordingly,", insert -- a --.
Line 62, delete "the frame 61, that is,".
Line 63, after "can", delete "continuously".
Line 63, after "be", insert -- continuously --.
Line 66, after the first instance of "of", insert -- the --.

Column 7,
Lines 1, 64 and 66, delete "rise", and insert -- rising --.
Lines 1 and 65, delete "fall", and insert -- falling --.
Line 4, delete "and", insert -- where --.
Line 15, after "constituted", insert -- so --.
Line 20, after "constituted", insert -- so as --.
Line 20, delete "direction approaching", and insert -- radial direction from --.
Line 21, delete "of", and insert -- to --.
Lines 21 and 22, after "91 ", delete "and a direction separating therefrom.", and insert -- . --.
Line 24, after "is", insert -- movably --.
Line 33, delete "mark", and insert -- marked --.
Line 36, delete "later, a", and insert -- later. A --.
Line 37, after "of", delete "which", and insert -- drive shaft 87 --.
Line 37, after "portion,", insert -- and --.
Line 38, after "87", insert -- , --.
Line 44, delete "82", and insert -- 87 --.
Line 66, delete "on", and insert -- to --.

Column 8,
Lines 4, 7, 10 and 16, delete "mark", and insert -- marked --.
Lines 4 and 5, delete "frictionally coupled".
Line 10, delete "4", and insert -- 9 --.
Lines 12 and 33, delete "rise", and insert -- rising --.
Line 18, delete "coupling".
Line 19, after "force,", insert -- and --.
Lines 23 and 44, delete "that is,", and insert -- and thus --.
Lines 25 and 28, delete "4,", and insert -- 9, --.
Line 33, delete "fall", and insert -- falling --.

UNITED STATES PATENT AND TRADEMARK OFFICE
CERTIFICATE OF CORRECTION

PATENT NO. : 6,218,764 B1
DATED : April 17, 2001
INVENTOR(S) : Ryuichi Yoshida et al.

It is certified that error appears in the above-identified patent and that said Letters Patent is hereby corrected as shown below:

Column 8 (cont'd),
Lines 35, 36, 44 and 45, delete "number", and insert -- amount --.
Lines 48 and 51, after "than", insert -- the --.
Line 50, after "member),", insert -- the --.
Line 51, after "constituted", insert -- to be --.
Line 52, after the second instance of "of", insert -- the --.
Line 54, after "between", insert -- the --.
Line 55, after "of", insert -- the --.
Line 55, after "and", insert -- the --.
Line 62, after "elements", insert -- , --.

Column 9,
Line 19, after the first instance of "of", insert -- the --.
Line 20, after "of", insert -- the --.
Line 22, delete "waveform, the", and insert -- waveform. The --.

Column 11,
Line 33, after "voltage,", insert -- and --.
Line 50, before "other", insert -- any --.

Column 12,
Lines 4 and 5, after "provided", insert -- Although the present invention has been fully described by way of example with reference to the accompanying drawings, it is to be understood that various changes and modifications will be apparent to those skilled in the art. Therefore, unless such changes and modifications otherwise depart from the scope of the present invention, they should be construed as being included herein. --.

Signed and Sealed this

Fifteenth Day of April, 2003

JAMES E. ROGAN
*Director of the United States Patent and Trademark Office*